United States Patent
Zediker et al.

(10) Patent No.: US 11,980,970 B2
(45) Date of Patent: May 14, 2024

(54) VISIBLE LASER ADDITIVE MANUFACTURING

(71) Applicant: NUBURU, INC., Centennial, CO (US)

(72) Inventors: Mark S. Zediker, Castle Rock, CO (US); Jean Michel Pelaprat, Oak Park, IL (US)

(73) Assignee: Nuburu, Inc., Centennial, CO (US)

( * ) Notice: Subject to any disclaimer, the term of this patent is extended or adjusted under 35 U.S.C. 154(b) by 348 days.

(21) Appl. No.: 15/581,494

(22) Filed: Apr. 28, 2017

(65) Prior Publication Data

US 2017/0341180 A1 Nov. 30, 2017

Related U.S. Application Data

(60) Provisional application No. 62/329,786, filed on Apr. 29, 2016.

(51) Int. Cl.
*B23K 26/38* (2014.01)
*B22F 10/28* (2021.01)
(Continued)

(52) U.S. Cl.
CPC ............ *B23K 26/38* (2013.01); *B22F 10/28* (2021.01); *B22F 10/368* (2021.01); *B22F 12/41* (2021.01);
(Continued)

(58) Field of Classification Search
CPC .. B23K 26/0648; B23K 26/082; B23K 26/21; B23K 26/342; B23K 26/0876;
(Continued)

(56) References Cited

U.S. PATENT DOCUMENTS

| | | |
|---|---|---|
| 4,288,678 A | 9/1981 | LaRocca |
| 4,679,198 A | 7/1987 | Shone |

(Continued)

FOREIGN PATENT DOCUMENTS

| | | |
|---|---|---|
| CN | 1386608 A | 12/2002 |
| CN | 104742376 | 7/2015 |

(Continued)

OTHER PUBLICATIONS

Machine Translation of German Patent Document DE102011117607A1; Niedrig, Roman; 2013 (Year: 2013).*

(Continued)

*Primary Examiner* — Dana Ross
*Assistant Examiner* — Joseph W Iskra
(74) *Attorney, Agent, or Firm* — Glen P. Belvis; Belvis Law, LLC.

(57) ABSTRACT

A high resolution system for additive manufacturing, soldering, welding and other laser processing applications. A blue laser system for additive manufacturing, soldering, welding and other laser processing applications and operation for additive manufacturing of materials. Systems and methods for laser processing of materials, laser processing by matching preselected laser beam wavelengths to the material to be processed to have high or increased levels of absorptivity by the materials, and in particular laser additive manufacture of raw materials into large structures, parts, components and articles with laser beams having high absorptivity by starting raw materials.

13 Claims, 5 Drawing Sheets

(51) Int. Cl.

| | |
|---|---|
| *B22F 10/368* | (2021.01) |
| *B22F 12/41* | (2021.01) |
| *B22F 12/44* | (2021.01) |
| *B22F 12/49* | (2021.01) |
| *B22F 12/90* | (2021.01) |
| *B23K 26/06* | (2014.01) |
| *B23K 26/08* | (2014.01) |
| *B23K 26/082* | (2014.01) |
| *B23K 26/21* | (2014.01) |
| *B23K 26/34* | (2014.01) |
| *B23K 26/342* | (2014.01) |
| *B23K 103/04* | (2006.01) |
| *B23K 103/12* | (2006.01) |
| *B23K 103/14* | (2006.01) |
| *B29C 64/268* | (2017.01) |

(52) U.S. Cl.
CPC .............. *B22F 12/44* (2021.01); *B22F 12/49* (2021.01); *B22F 12/90* (2021.01); *B23K 26/0648* (2013.01); *B23K 26/082* (2015.10); *B23K 26/0876* (2013.01); *B23K 26/21* (2015.10); *B23K 26/34* (2013.01); *B23K 26/342* (2015.10); *B29C 64/268* (2017.08); *B22F 2998/10* (2013.01); *B23K 26/0643* (2013.01); *B23K 2103/04* (2018.08); *B23K 2103/12* (2018.08); *B23K 2103/14* (2018.08); *Y02P 10/25* (2015.11)

(58) Field of Classification Search
CPC .... B23K 26/34; B23K 26/38; B23K 2103/04; B23K 2103/12; B23K 2103/14; B23K 26/032; B23K 26/0643; B23K 26/0853; B23K 26/32; B23K 26/0665; B23K 26/0608; B23K 26/044; B23K 26/0676; B23K 26/0006; B23K 26/703; B23K 26/382; B23K 26/0622; B29C 64/268; B29C 64/393; B29C 64/153; B29C 64/277; B29C 64/273; B29C 64/295; B29C 64/10; B22F 3/1055; B22F 2003/1056; B22F 2998/10; B22F 12/00; B22F 10/10; B22F 10/00; B22F 12/41; B22F 12/44; B22F 12/45; B22F 12/47; B22F 10/28; B22F 10/20; B22F 12/20; B22F 12/90; B22F 12/17; B22F 12/13; B22F 12/43; B22F 10/36; B22F 10/80; B22F 10/12; B22F 10/366; B22F 10/362; B22F 10/25; B22F 10/30; B22F 12/49; B22F 10/368; Y02P 10/25; B33Y 30/00; B33Y 10/00; B33Y 80/00; B33Y 50/02; B33Y 50/00; B33Y 70/00; H01S 5/4087; H01S 5/02253; H01S 5/146; H01S 5/0092; H01S 3/302; H01S 5/405; H01S 5/4012; H01S 5/32341; H01S 3/067; H01S 5/4062; H01S 3/30; G02B 27/0922; G02B 6/02052; C04B 35/573; C04B 35/5603; C04B 35/571; C04B 35/65; B28B 1/001
USPC ....................... 219/121.6–67, 121.85, 121.61
See application file for complete search history.

(56) References Cited

U.S. PATENT DOCUMENTS

| | | |
|---|---|---|
| 4,847,479 A | 7/1989 | Clark |
| 4,857,699 A | 8/1989 | Duley |
| 4,879,449 A | 11/1989 | Duley |
| 4,930,855 A | 6/1990 | Clark |
| 4,960,973 A | 10/1990 | Fouch |
| 4,973,819 A | 11/1990 | Thatcher |
| 5,127,019 A | 6/1992 | Epstein |
| 5,379,310 A | 1/1995 | Papen |
| 5,392,308 A | 2/1995 | Welch |
| 5,393,482 A | 2/1995 | Benda |
| 5,502,292 A | 3/1996 | Pernicka |
| 5,526,155 A | 6/1996 | Knox |
| 5,578,227 A | 11/1996 | Rabinovich |
| 5,808,803 A | 9/1998 | Uliman |
| 5,903,583 A | 5/1999 | Uliman |
| 5,923,475 A | 7/1999 | Kurtz |
| 5,986,794 A | 11/1999 | Krause |
| 5,987,043 A | 11/1999 | Brown |
| 6,085,122 A | 7/2000 | Manning |
| 6,124,973 A | 9/2000 | Du |
| 6,129,884 A | 10/2000 | Beers |
| 6,151,168 A | 11/2000 | Goering |
| 6,175,452 B1 | 1/2001 | Uilmann |
| 6,191,383 B1 | 2/2001 | Jense |
| 6,192,062 B1 | 2/2001 | Sanchez-Rubio |
| 6,208,679 B1 | 3/2001 | Sanchez-Rubio |
| 6,212,310 B1 | 4/2001 | Waarts |
| 6,251,328 B1 | 6/2001 | Beyer |
| 6,331,692 B1 | 10/2001 | Krausse |
| 6,327,292 B1 | 12/2001 | Sanchez-Fubio |
| 6,575,863 B2 | 6/2003 | Piltch |
| 6,584,133 B1 | 6/2003 | Walker |
| 6,591,040 B1 | 7/2003 | Dempewolf |
| 6,940,037 B1 | 9/2005 | Kovacevic |
| 7,001,467 B2 | 2/2006 | Pique |
| 7,006,549 B2 | 2/2006 | Anikitchev |
| 7,034,992 B2 | 4/2006 | Komine |
| 7,107,118 B2* | 9/2006 | Orozco ............... B23K 26/348 219/121.61 |
| 7,233,442 B1 | 6/2007 | Brown |
| 7,570,856 B1 | 8/2009 | Minelly |
| 7,765,022 B2 | 7/2010 | Mazumder |
| 7,959,353 B2 | 6/2011 | Anatharaman |
| 8,130,807 B2 | 3/2012 | Schulz-Harder |
| 8,488,245 B1 | 7/2013 | Chann |
| 8,520,311 B2 | 8/2013 | Krause |
| 8,553,327 B2 | 10/2013 | Chann |
| 8,559,107 B2 | 10/2013 | Chann |
| 8,670,180 B2 | 3/2014 | Chann |
| 8,724,222 B2 | 5/2014 | Chann |
| 9,093,822 B1 | 7/2015 | Chann |
| 9,172,208 B1 | 10/2015 | Dawson |
| 9,104,029 B2 | 11/2015 | Tayebati |
| 9,178,333 B2 | 11/2015 | Tayebati |
| 9,190,807 B2 | 11/2015 | Tayebati |
| 9,203,209 B2 | 12/2015 | Ramachandran |
| 9,256,073 B2 | 2/2016 | Chann |
| 9,268,097 B2 | 2/2016 | Huang |
| 9,268,142 B2 | 2/2016 | Chann |
| 9,310,560 B2 | 4/2016 | Chann |
| 9,522,426 B2* | 12/2016 | Das .................. C30B 19/08 |
| 10,112,262 B2* | 10/2018 | Cheverton ........... B23K 26/342 |
| 2001/0023921 A1* | 9/2001 | Mano ................. H04N 1/50 250/234 |
| 2002/0149137 A1 | 10/2002 | Jang |
| 2003/0048819 A1 | 3/2003 | Nagano |
| 2003/0052105 A1 | 3/2003 | Nagano |
| 2003/0063631 A1 | 4/2003 | Corcoran |
| 2003/0142393 A1 | 7/2003 | Kuksenkov |
| 2004/0056006 A1 | 3/2004 | Jones |
| 2004/0086004 A1 | 5/2004 | Bonaccini |
| 2004/0094527 A1 | 5/2004 | Bourne |
| 2004/0156401 A1 | 8/2004 | Sandrock |
| 2004/0173587 A1 | 9/2004 | Musselman |
| 2004/0036242 A1 | 12/2004 | Orozco |
| 2004/0254474 A1 | 12/2004 | Seibel |
| 2005/0103760 A1 | 5/2005 | Kaplan |
| 2005/0173385 A1 | 8/2005 | Smart |
| 2006/0160332 A1 | 7/2006 | Gu |
| 2007/0041083 A1 | 2/2007 | Di Teodoro |
| 2008/0085368 A1 | 4/2008 | Abe |
| 2009/0051935 A1 | 2/2009 | Cooper |

(56) References Cited

U.S. PATENT DOCUMENTS

| | | |
|---|---|---|
| 2009/0190218 A1 | 7/2009 | Govorkov |
| 2009/0225793 A1 | 9/2009 | Marciante |
| 2010/0290106 A1 | 11/2010 | Digiovanni |
| 2011/0122482 A1 | 5/2011 | Mead |
| 2011/0129615 A1 | 6/2011 | Renn |
| 2011/0205349 A1 | 8/2011 | Li |
| 2011/0216792 A1 | 9/2011 | Chann |
| 2011/0259862 A1 | 10/2011 | Scott |
| 2011/0267671 A1 | 11/2011 | Peng |
| 2011/0311389 A1 | 12/2011 | Ryan |
| 2012/0012570 A1 | 1/2012 | Briand |
| 2012/0020631 A1 | 1/2012 | Rinzler |
| 2012/0285936 A1 | 11/2012 | Urashima |
| 2013/0071738 A1 | 3/2013 | Wang |
| 2013/0148673 A1 | 6/2013 | Creeden |
| 2013/0162952 A1 | 6/2013 | Lippey et al. |
| 2013/0269748 A1 | 10/2013 | Wiedeman et al. |
| 2014/0023098 A1 | 1/2014 | Clarkson |
| 2014/0086539 A1 | 3/2014 | Goutain et al. |
| 2014/0112357 A1 | 4/2014 | Abedin |
| 2014/0163717 A1* | 6/2014 | Das .................. B33Y 10/00 700/119 |
| 2014/0249495 A1 | 9/2014 | Mumby et al. |
| 2014/0252687 A1 | 9/2014 | El-Dasher |
| 2014/0265046 A1* | 9/2014 | Burris ................ B22F 3/1055 264/497 |
| 2015/0033343 A1 | 1/2015 | Jiang |
| 2015/0165556 A1 | 6/2015 | Gordon |
| 2015/0333473 A1 | 11/2015 | Gapontsev |
| 2016/0067780 A1 | 3/2016 | Zediker |
| 2016/0067827 A1 | 3/2016 | Zediker |
| 2016/0114431 A1* | 4/2016 | Cheverton ........... B23K 26/342 219/76.1 |
| 2016/0322777 A1 | 11/2016 | Zediker et al. |
| 2017/0021454 A1 | 1/2017 | Joseph |
| 2017/0021455 A1 | 1/2017 | Dallarosa |
| 2017/7021454 | 1/2017 | Dallarosa |
| 2017/0341144 A1 | 11/2017 | Pelaprat et al. |
| 2017/0341180 A1 | 11/2017 | Zediker et al. |
| 2017/0343729 A1 | 11/2017 | Zediker et al. |
| 2018/0236605 A1 | 8/2018 | Finuf et al. |
| 2018/0375296 A1 | 12/2018 | Zediker et al. |
| 2019/0025502 A1 | 1/2019 | Zediker et al. |
| 2019/0089983 A1 | 3/2019 | Choe et al. |
| 2019/0273365 A1 | 9/2019 | Zediker et al. |
| 2019/0361171 A1 | 11/2019 | Lee |
| 2020/0086388 A1 | 3/2020 | Zediker et al. |
| 2020/0094478 A1 | 3/2020 | Zediker et al. |

FOREIGN PATENT DOCUMENTS

| | | |
|---|---|---|
| DE | 102013011676 | 1/2013 |
| EP | 1437882 | 7/2004 |
| EP | 1020180017080 A | 12/2016 |
| EP | 3307525 | 4/2018 |
| EP | 3307526 | 4/2018 |
| EP | 17790523.9 | 12/2019 |
| JP | 6225263 | 6/2015 |
| KR | 1020180017081 A | 12/2016 |
| KR | 10-2018-703763 | 8/2019 |
| RU | 2132761 C1 | 7/1999 |
| RU | 2141881 C1 | 11/1999 |
| RU | 2205733 C2 | 6/2003 |
| WO | PCT/US2014/035928 | 8/2014 |
| WO | WO 2015134075 | 9/2014 |
| WO | 2014179345 A1 | 11/2014 |
| WO | WO 2014/179345 | 11/2014 |
| WO | WO-2014179345 A1 * | 11/2014 ............. B22F 10/00 |
| WO | PCT/US2015/047226 | 8/2015 |
| WO | PCT/US2016/042368 | 12/2016 |
| WO | WO 2016201309 | 12/2016 |
| WO | WO 2016201326 | 12/2016 |
| WO | PCT/US2017/030174 | 7/2017 |
| WO | PCT/US2017/030059 | 12/2017 |
| WO | PCT/US2017/030088 | 12/2017 |
| WO | PCT/2018/016119 | 4/2018 |
| WO | PCT/US2018/028698 | 7/2018 |

OTHER PUBLICATIONS

2012, Jürgen Bertling, DDM—An Approach Towards Sustainable Production?.
1998, Dongping Shi, Surface Finishing of Selective Laser Sintering Parts w/ Robot.
Aug. 18, 2017, Johannes Trapp, In situ absorptivity measurements of metallic powders during laser powder-bed fusion additive manufacturing.
Dec. 1, 2006, GSI, CRS Series—Resonant Optical Scanners.
2009, Newport Corporation, Workstation for Laser Direct-Write Processing 39.
2004, 3D Systems Inc, Sinterstation HIQ Series—SLS Systems Brochure.
2003, Raymond M. Karam, A New 3D, Direct Write, Sub-Micron Microfabrication Process that Achieves True Optical, Mechatronic and Packaging Integration on Glass-Ceramic Substrates.
2010, 3D Systems Inc, iPro 8000 & 9000 Brochure.
2002, J. A. Ramos, Surface Over-Melt during Laser Polishing of Indiect-SLS Metal Parts.
2012, 3D Systems Inc, sPro 125 and sPro 250-Direct Metal SLM Production Printer.
2012, 3D Systems Inc, sPro Family Brochure.
2001, J.A. Ramos, Surface Roughness Enhancement of Indirect-SLS Metal Parts by Laser Surface Polishing.
1993, William T. Carter, Direct Laser Sintering of Materials.
2012, Object Ltd., 10 Reasons Why Multi-Material 3D Printing is Better for your Product Design & Development.
Nov. 2012, Concept Laser, X line 100R-Metal laser Melting System.
Nov. 13, 2014, Fraunhofer ILT, Selective Laser Melting Press Relealse.
Sep. 21, 2017, 3D Print.com, Nuburu blue laser system.
2016, Wave Spectrum Laser, Inc, 405nm 6W Laser System.
2016, Wave Spectrum Laser, Inc, Package—High Power LD-650 nm LD 1000mW High Power—C Mount Package Laser Diodes.
Aug. 2005, Larry Johnson Laser, Diode Burn-In and Reliability Testing.
Nov. 17, 2012, Nobuyasu Suzuki, 10 W CW blue-violet diode laser array on the micro-channel cooler.
2016, Crysta Laser, Diode pumped 473 nm blue Crysta Laser.
2014, Coherent, Inc, HighLight 1000FL-1kW Industrial OEM Fiber Laser.
2007, Chong Cook Kim, Degradation Modes of inGaN Blue-Violet Laser Diodes—Grown on Bulk GaN Wafers.
2013, Andreas Unger, High-power fiber-coupled 100 W visible spectrum diode lasers for display applications.
2016, Dilas Industrial Laser Systems, Compact (Blue) Diode Laser.
2016, Crysta Laser, Stabilized 375/405/445/456/473/390-488nm Violet-blue Lasers.
2013, C. P. Gonschior, High power 405 nm diode laser fiber-coupled single-made system with high long-term stability.
2013, Torrey Hills Technologies, LLC, Understanding of Laser, Laser diodes, Laser diode packaging and it's relationship to Tungsten Copper.
Mar. 15, 1996, Helms, Life tests of Nichia AlGaN/InGaN/GaN blue-light-emitting diodes (Sandia National Laboratories).
Sep. 3, 1997, Melanie Ott, Capabilities and Reliability of LEDs and Laser Diodes.
2008, nLight, Single Emitter Diode Laser Devices (Visible).
Jan. 2000, Shuji Nakamura, Current Status and Future prospects of InGaN-Based Laser Diodes.
Jan. 2012, IPG Photogenics, YLM Fiber Laser-Single Mode Series.
2004, Frangois Gonthier, High-power All-fiber components: the missing link for high power fiber lasers.
May/Jun. 2007, Thomas H. Loftus, Spectrally Beam-Combined Fiber Lasers for High-Average—Power Applications.

(56) References Cited

OTHER PUBLICATIONS

2010, Christophe A. Codemard, 100 W CW Cladding-Pumped Raman Fiber Laser at 1120 NM.
2007, Nathan B. Terry, Raman Fiber Lasers and Amplifiers Based on Multimode Graded-Index Fibers and Their Application to Beam Cleanup.
Jun. 1997, I. K. Ilev, Ultraviolet and blue discretely tunable-pass fiber Raman laser.
2004, Qin, Blue Up-Conversion Fibre Laser Pumped by a 1120-nm Raman Laser.
Jun. 24, 2010, John E. Heebner, High Brightness, quantum-defect-limited conversion efficiency in cladding-pumped Raman fiber amplifiers and oscillators.
2015, Huawei Jiang, Cascaded-cladding-pumped cascaded Raman fiber amplifier.
Feb. 2007, Christophe Andre Codemard, High-Power Cladding-Pumped Raman and Erbium-Ytterbium Doped Fibre Solutions.
1942, CV Raman, The Physcis of the Diamond.
Aug. 2011, Ondrej Kitzler, CW Diamond laser architecture for high average power raman beam conversion.
Oct. 1, 2014, N. V. Surovtsev, Temperature Dependence of the Raman line width in diamond: Revisited.
2012, Vasili G. Savitski, Steady-State Raman Gain in Diamond as a Function of Pump Wavelength.
2011, Jean-Philippe M. Feve, High average power diamond Raman laser.
Nov. 20, 2015, Tianfu Yao, High-power Continuous-Wave Directly-Diode-Pumped Fiber Raman Lasers.
Jun. 1, 2008, Arman B. Fallahkhair, Vectore Finite Difference Modesolver for Anisoptropic Dielectric Waveguides.
Jan. 2011, Jean-philippe Feve, High average power diamond Raman laser.
Jan. 2016, Ekaterina A. Zlobina, Singlemode Raman Lasing in Graded-Index Fiber Pumped by High-Power 915-nm Laser Diode.
Jun. 2016, Yaakov Glick, High power, high efficiency diode pumped Raman fiber laser.
Nov. 2015, Yao, High-Power Continuous-Wave Directly-Diode-Pumped Fiber Raman Lasers.
2004, R.P. Mildren, Efficient, all-solid-state, Raman laser in the yellow, orange, and red.
Nov. 11, 1992, Katsusuke Tajima, Low Rayleigh Scattering P2 O5-F-Si O2 Glasses.
Aug. 1, 1976, K. O. Hill, Low-threshold cw Raman laser.
Jan. 2017, Ekaterina A. Zlobina, graded-index fiber directly pumped by a multimode laser diode.
Nov. 18, 2003, Shenghong Huang, Generation of 10.5 W 1178 nm Laser Based on Phosphosilicate Raman Fiber Laser.
Aug. 10, 2015, Hongxin Sum, Investegation of Stimulated Raman Scattering in a Phosphorus-doped silica fiber.
2017, Aaron McKay, Diamond-based Concept for combining beams at very high average powers.
Jun. 1997, I. K. Ilev, Ultraviolet and blue discretely tunable double-pass fiber Raman laser.
Nov. 7, 2004, V. A. Lisinetskii, Raman Gain Coefficient of Barium Nitrate Measured for the Spectral Region of TI: Sapphire Laser.
Dec. 2003, Nathan R. Newbury, Pump-Wavelength Dependence of Raman Gain in Single-Mode Optical Fibers.
Jan. 1, 2014, CPT, Reduced Mode Sapphire Optical Fiber and Sensing System.
Jul. 15, 2002, N. R. Newbury, Rman gain: pump-wavelength dependence in single-mode fiber.
Jan. 2016, Ekaterina A. Zlobina, Raman Lasing in GRIN Fibers with 915-nm Diode Pumping.
May/Jun. 2002, Mohammed N. Islam, Raman Amplifiers for Telecommunications.
Aug. 2005, A. Marf inez Rios, Analytical approach for the design of cascaded raman fiber lasers.
Nov. 11, 2000, Kyozo Tsujikawa, Rayleigh Scattering Reduction Method for Silica-Based Optical Fiber.
2005, Clara Rivero, Resolved discrepancies between visible Spontaneous Raman cross-Section and direct near-infrared Raman gain measurements in TeO2.
Aug. 20, 1997, Rick K. Nubling, Optical properties of single-crystal sapphire fibers.
2014, Yves Colombe, Single-mode Opticai fiber for high-power, low-loss UV transmission.
Jan. 2015, David J. Spence, Spatial and Spectral Effects in Continuous Wave Intracavity Raman Lasers.
Apr. 2014, Bonner, Spectral broadening in Continuous-wave intracavity Raman lasers.
May 30, 2013, A. A. Lenin, The phase-controlled Raman effect.
2006, Robert Anthony Michael Stegeman, Direct Nonlinear Optics Measurements of Raman Gain in Bulk Glasses and Estimates of Fiber Performance.
2007, Nathan B. Terry, graded-index multimode fiber for SRS beam combinaton.
May 15, 2005, V. G. Plotnichenko, Raman band intensities of tellurite glasses.
Nov. 23, 2000, P.A. Champert, Tunable, broad visible Range, fibre-based Rarnan Source.
Apr. 2012, Christian Agger, Supercontinuum generation in ZBLAN fibers-detailed comparison between measuremnt and simulation.
1997, Keming Du, Fiber-coupling technique with micro step-rnirros for high-power diode laser bars.
1999, C.C. Cook, Spectral Beam Combing of Yb-doped Fiber Lasers in an External Cavity.
Aug. 1977, W. J. Tomlinson, Wavelength multiplexing in multimode optical fibers.
1996, Shih-Hsiang Hsu, External Cavity Laser Array with Monolithically Integrated Glass Waveguide and Rowland Circle.
1999, Jason N. Farmer, Incoherent Beam Combination of Diode Laser Bars.
1998, H.G. Treusch, Fiber-Coupling technique for high-power diode laser arrays.
2012, Y. Xiao, 1-Kilowatt CW all-fiber laser oscillator pumped with wavelength-beam-combined diode stacks.
Feb. 15, 2007, Robin K. Huang, High-Brightness Wavelength Beam Combined Semiconductor Laser Diode Arrays.
May/Jun. 2005, T. Y. Fan, Laser Beam Combining for High-Power, High-Radiance Sources.
2006, B. Chann, High-Brighness Wavelength-Beam-Combined Diode Laser Stcks Using a Volume Bragg Grating (VBG).
May 2002, Erik J. Bochove, Theory of Spectral Beam Combining of Fiber Lasers.
2001, A.K. Goyal, Wavelength Beam Combining of Mid-IR Semiconductor Lasers.
Mar./Apr. 2009, Oleksiy Andrusyak, Spectral Combining and Coherent coupling of Lasers by Volume Bragg Gratings.
Apr. 2005, Dennis Lowenthal, Across the Spectrum: Combining laser emitters yields a high-power source with a useful beam.
Jun. 18, 2003, Steven C. Tidwell, Spectral beam combining of diode laser bars achieve effiecient near diffraction limited output power (Abstract only).
Jun. 1, 2004, Charles E. Hamiltor, High-power laser source with spectrally beam-combined diode laser bars (abstract only).
2011, Sims, Spectral beam combining of 2 um Tm fiber laser systems.
2009, Lee, Benjamin G, Wavelength beam combining of quantum cascade laser arrays for remote sensing.
1997, Keming Du, Fiber-coupling technique with micro step-mirros for high-power diode laser bars.
1999, C.C. Cook, Spectral Beam Combing of Yb-doped Fiber Lasers in External Cavity.
2007, Oleksiy Andrusyak, Power Scaling of Laser Systems Using Spectral Beam Combining with Volume Bragg Gratings in PTR Glass.
1988, David L. Begley, Aperture Shared Laser diode array beam combiner.
1999, Jason N. Farmer, 50 × improvement in diode beam quality.
2008, Juliet T. Gopinath, 1450-nm high-brightness wavelength-beam combined diode laser array.

(56) References Cited

OTHER PUBLICATIONS

1993, G. C. Papen, Multiple-wavelength operation of a laser-diode array coupled to an external cavity.
1997, H. Tanobe, OFC '97 Technical Digest—a four-channel multiwavelengthfibergrating external- cavity-laser.
1997, Martin Zirngibl, OFC '97 Technical Digest—Multiple wavelength sources, detectors, and routers.
Nov. 23, 2014, Jeff Hecht, Photonic Frontiers: beam combining.
2007, Oleksiy Andrusyak, Power Scaling of Laser Systems Using Spectral Beam Combining with Volue Bragg Gratings in PTR Glass.
2011, R. Andrew Sims, Spectral beam combining of 2 um Tm fiber laser systems.
Feb. 10, R. Andrew Sims, Spectral beam combining of thulim fiber laser systems (abstract only).
Jun. 1, 2004, Charles E. Hamilton, High-power laser source with Spectrally beam-combined diode laser bars (abstract only).
Apr. 20, 1987, Chandrasekhar Roychoudhuri, Laser Beam Combining Technology (abstract only).
Jan./Feb. 2001, Shu Namiki, Ultrabroad-Band Raman Amplifiers Pumped and Gain-Equalized by Wavelength-Division.
International Search Report of the International Searching Authority, PCT/US2014/035928, dated Aug. 26, 2014.
Written Opinion of the International Searching Authority, PCT/US2014/035928, dated Aug. 26, 2014.
International Preliminary Report on Patentability, PCT/US2014/035928, dated Nov. 3, 2015.
International Search Report of the International Searching Authority, PCT/US2015/047226 dated Jan. 7, 2016.
Written Opinion of the International Searching Authority, PCT/US2015/047226, dated Jan. 7, 2016.
Communication Pursuant to Rules 70(2) and 70a(2) EPC, EP14791734.8, dated Oct. 14, 2016.
Translation of the Official Action, RU015151016/02, dated Mar. 20, 2017.
Translation of the Search Report, RU015151016/02 (078493), Search Completed Mar. 4, 2017.
Extended European Search Report, EP14791734.8, dated Sep. 27, 2016.
Machine Language Translation, 1386608ACN, Dec. 25, 2002.
International Search Report, PCT/US16/42363, dated Dec. 8, 2016.
Written Opinion of the International Searching Authority, PCT/US16/42363, dated Dec. 8, 2016.
Machine Translation, JP2003-340924, Dec. 2, 2003.
Machine Translation, JP2003-206323, Jul. 22, 2003.
Translation of the Abstract, RU2132761C1, Jul. 10, 1999.
Translation of the Abstract, RU2205733C2, Jun. 10, 2003.
U.S. Appl. No. 15/581,928, Pelaprat, filed Apr. 28, 2017.
U.S. Appl. No. 15/581,494, Zediker, filed Apr. 28, 2017.
U.S. Appl. No. 15/581,263, Zediker, filed Apr. 28, 2017.
PCT, Search Report Report PCT/US2017/030175, dated Jul. 13, 2017.

\* cited by examiner

VISIBLE LASER ADDITIVE MANUFACTURING

This application claims under 35 U.S.C. § 119(e)(1) the benefit of the filing date of U.S. provisional application Ser. No. 62/329,786 filed Apr. 29, 2016, the entire disclosure of which is incorporated herein by reference.

BACKGROUND OF THE INVENTION

Field of the Invention

The present inventions relate to laser processing of materials and in particular laser building of materials including laser additive manufacturing processes using laser beams having wavelengths from about 350 nm to about 700 nm.

Infrared red (IR) based (e.g., having wavelengths greater than 700 nm, and in particular wavelengths greater than 1,000 nm) additive manufacturing systems suffer from, among other things, two short comings, which limit both the build volume and the build speed. In these IR systems the build volume is limited by the finite size of the scanning systems and the spot that can be created for a given focal length collimator and f-theta lens. For example, when using a 14 mm focal length collimator and a 500 mm F-theta focal length lens the spot size is on the order of 50 μm for a diffraction limited IR laser beam. This gives an addressable foot print on the raw build material, e.g., a powder bed, of approximately 85 mm×85 mm, which in turn creates or establishes the finite limitation on the build volume for that given resolution (e.g., spot size). The second limitation on the build speed for IR laser systems is the absorption of the laser beam by the materials. Most raw build materials have a modest to low reflectivity for wavelengths in the infrared spectrum. As a consequence, the coupling of the infrared laser energy into the raw build materials, e.g., powder bed or particles, is limited with a significant portion of the energy being reflected away, backward or deeper into the raw build material. These limitations are in a way further tied or linked together, compounding the problems and deficiencies of IR additive systems. Thus, the finite penetration depth of the Infrared laser light determines the optimum layer thickness and as a consequence, limits the resolution of the process. Thus, IR laser systems, because of their reflectivity to the typical raw build material have limited layer thicknesses and thus limited resolution.

As used herein, unless expressly stated otherwise, "UV", "ultra violet", "UV spectrum", and "UV portion of the spectrum" and similar terms, should be given their broadest meaning, and would include light in the wavelengths of from about 10 nm to about 400 nm, and from 10 nm to 400 nm.

As used herein, unless expressly stated otherwise, the terms "visible", "visible spectrum", and "visible portion of the spectrum" and similar terms, should be given their broadest meaning, and would include light in the wavelengths of from about 380 nm to about 750 nm, and 400 nm to 700 nm.

As used herein, unless expressly stated otherwise, the terms "blue laser beams", "blue lasers" and "blue" should be given their broadest meaning, and in general refer to systems that provide laser beams, laser beams, laser sources, e.g., lasers and diodes lasers, that provide, e.g., propagate, a laser beam, or light having a wavelength from about 400 nm to about 500 nm.

As used herein, unless expressly stated otherwise, the terms "green laser beams", "green lasers" and "green" should be given their broadest meaning, and in general refer to systems that provide laser beams, laser beams, laser sources, e.g., lasers and diodes lasers, that provide, e.g., propagate, a laser beam, or light having a wavelength from about 500 nm to about 575 nm.

Generally, the term "about" as used herein, unless specified otherwise, is meant to encompass a variance or range of ±10%, the experimental or instrument error associated with obtaining the stated value, and preferably the larger of these.

This Background of the Invention section is intended to introduce various aspects of the art, which may be associated with embodiments of the present inventions. Thus the forgoing discussion in this section provides a framework for better understanding the present inventions, and is not to be viewed as an admission of prior art.

SUMMARY

The present inventions solve these problems with IR additive manufacturing systems and process, and address these and other long felt needs, as well as future needs as additive manufacturing process and systems achieve greater prevalence. The present inventions, among other things, solve these problems and needs by providing the articles of manufacture, devices and processes taught, and disclosed herein.

Thus, there is provided a blue laser system, the system having: a blue laser source capable of propagating a blue laser beam; an X-Y scanning system in optical communication with the blue laser source, whereby the system is capable of directing and scanning the blue laser beam to an addressable field; and an enclosure housing the addressable field.

Moreover there are provided these systems, apparatus and methods having one or more of the following features: having an electronically adjustable lens system; the lens system having a first optic, a second optic, and a third optic, wherein the second optic is located along a laser beam path between the first optic and the third optic, wherein the second optic is movable between a plurality of positions along the laser beam path, whereby the system is capable of on the fly focusing to simulate the performance of an F-Theta lens; having an F-Theta lens, and an electronically adjustable lens system; the lens system having a first optic, a second optic, and a third optic, wherein the second optic is located along a laser beam path between the first optic and the third optic, wherein the second optic is movable between a plurality of positions along the laser beam path, whereby the lens system is capable of compensating for the field curvature of an F-Theta lens system; and having an electronically adjustable lens system; the lens system having a first optic, a second optic, and a third optic, wherein the second optic is located along a laser beam path between the first optic and the third optic, wherein the second optic is movable between a plurality of positions along the laser beam, whereby the system is capable of adjusting the laser beam diameter on the fly as the laser beam is scanned.

Further, there are provided these systems, apparatus and methods having one or more of the following features: wherein the addressable field has an area in the range of from about 100 mm×100 mm to about 200 mm×200 mm; wherein the addressable field has an area in the range of from 100 mm×100 mm to about 300 mm×300 mm; wherein the addressable field is an addressable volume having an area in the range of from about 100 mm×100 mm×100 mm to about 200 mm×200 mm×200 mm; wherein the addressable field is an addressable volume having an area in the range of from about 100 mm×100 mm×100 mm to about 300 mm×300 mm×300 mm; wherein the addressable field is an addressable volume having an area of about 800 mm×400 mm×500 mm, and larger areas; wherein the system is capable of performing a laser operation selected from the group operations consisting of welding metal, cutting metal, cutting non-metal, and soldering electronic components; and wherein the system is capable of performing a laser operation; the laser operation including welding metal, cutting metal and cutting non-metal.

Yet further there is provided a blue laser system, the system having: a blue laser source capable of propagating a blue laser beam; an X-Y scanning system in optical communication with the blue laser source, whereby the system is capable of directing and scanning the blue laser beam along a laser beam path to an addressable field; and an enclosure housing the addressable field; an electronically adjustable lens system; the lens system having a first optic, a second optic, and a third optic, wherein the second optic is located along a laser beam path between the first optic and the third optic; wherein the second optic is movable between a plurality of positions along the laser beam path; whereby the system is capable of focusing the blue laser beam to a spot, having a blue laser beam spot size; whereby the addressable field defines an area; whereby the area of the addressable field is 2× larger than an area of an addressable field for an infrared laser beam having an infrared laser beam spot size that is the same size as the blue laser beam spot size and that is propagated through the system along the same laser beam path.

Further, there are provided these systems, apparatus and methods having one or more of the following features: wherein the controller is capable of adjusting a diameter of the laser beam based upon the size of the addressable field; and, wherein the controller is capable of adjusting a power of the laser beam to maintain a weld puddle at a predetermined temperature; having a pyrometer capable of monitoring a temperature of a weld puddle and provide a feedback signal to a control system; whereby the system is capable of maintaining the weld puddle at a predetermined temperature; having a thermal camera capable of monitoring a temperature of a weld puddle; a control system having an image processing system capable of determining the size and temperature of a weld puddle; wherein the thermal camera is capable of providing well puddle temperature and size information to the control system; and whereby the control system is capable of maintaining the weld puddle at a predetermined size and temperature; wherein a camera is capable of monitoring the size and shape of the weld puddle to provide information to determine the laser power and spot size required to maintain a predetermined well puddle size and stability; is capable of processing non-metals; is capable of marking metals; and is capable of soldering metals.

There is further provided a method of performing high resolution laser 3-D laser additive manufacturing, the method having: providing a build material in a laser build chamber; generating a single mode blue laser beam with an $M^2$ of 1.5 or less and a power of greater than 100 W; directing the laser beam along a laser beam path, the laser beam path extending into and through an optical processing assembly and to the build material; pulsing and scanning the laser beam at a predetermined pulse rate and a predetermined scan rate, wherein the predetermined pulse rate is sufficient to join the build material into a part without ablating the build material; and, whereby the resolution of the method is smaller than 75 µm.

Further, there are provided these systems, apparatus and methods having one or more of the following features: wherein the resolution is 50 µm or smaller; wherein the resolution is 5 µm or smaller; wherein the laser beam has a power of about 200 W; wherein the optical processing assembly comprises a means for scanning the laser beam, a means for collimating the laser beam, and a means for focusing the laser beam; wherein the means for collimating the laser beam comprises a 14 mm focal length lens; wherein the means for scanning comprises an x-y scanner; wherein the x-y scanner comprises a high speed galvanometer; wherein the means for focusing comprises a 1.2 meter focal length lens; wherein the pulse laser beam at the build material has a spot size cross section of 50 µm and a fluence level of up to 10 MW/cm$^2$; wherein the laser beam power is about 200 W, the laser beam pulse rate is about 100 kHz, and the laser beam scan rate is about 5 m/sec; wherein the laser beam power is about 200 W, the laser beam pulse rate is about 1 MHz, and the laser beam scan rate is about 50 m/sec; wherein the laser beam power is about 200 W, the laser beam pulse rate is about 100 kHz, and the laser beam scan rate is about 5 m/sec; wherein the laser beam power is about 200 W, the laser beam pulse rate is about 1 MHz, and the laser beam scan rate is about 50 m/sec; and wherein the optical processing assembly comprises a means for scanning the laser beam and a F-theta lens.

A system for performing high resolution laser 3-D laser printing, the system having: a blue laser, capable of producing a single mode blue laser; a laser beam path, the laser beam path extending from the blue laser into and through an optical processing assembly and to a build area; the optical processing assembly having a laser scanning and focusing system; the build area capable of holding a build material; a means for pulsing the laser beam at a predetermined pulse rate; wherein upon delivery of the pulsed laser beam to the build material the system is capable of scanning the pulsed laser beam at rate whereby the build material will be joined into a part without ablation of the build material; and wherein the resolution of the part is smaller than 75 µm.

DESCRIPTION OF THE PREFERRED EMBODIMENTS

Figure 1:
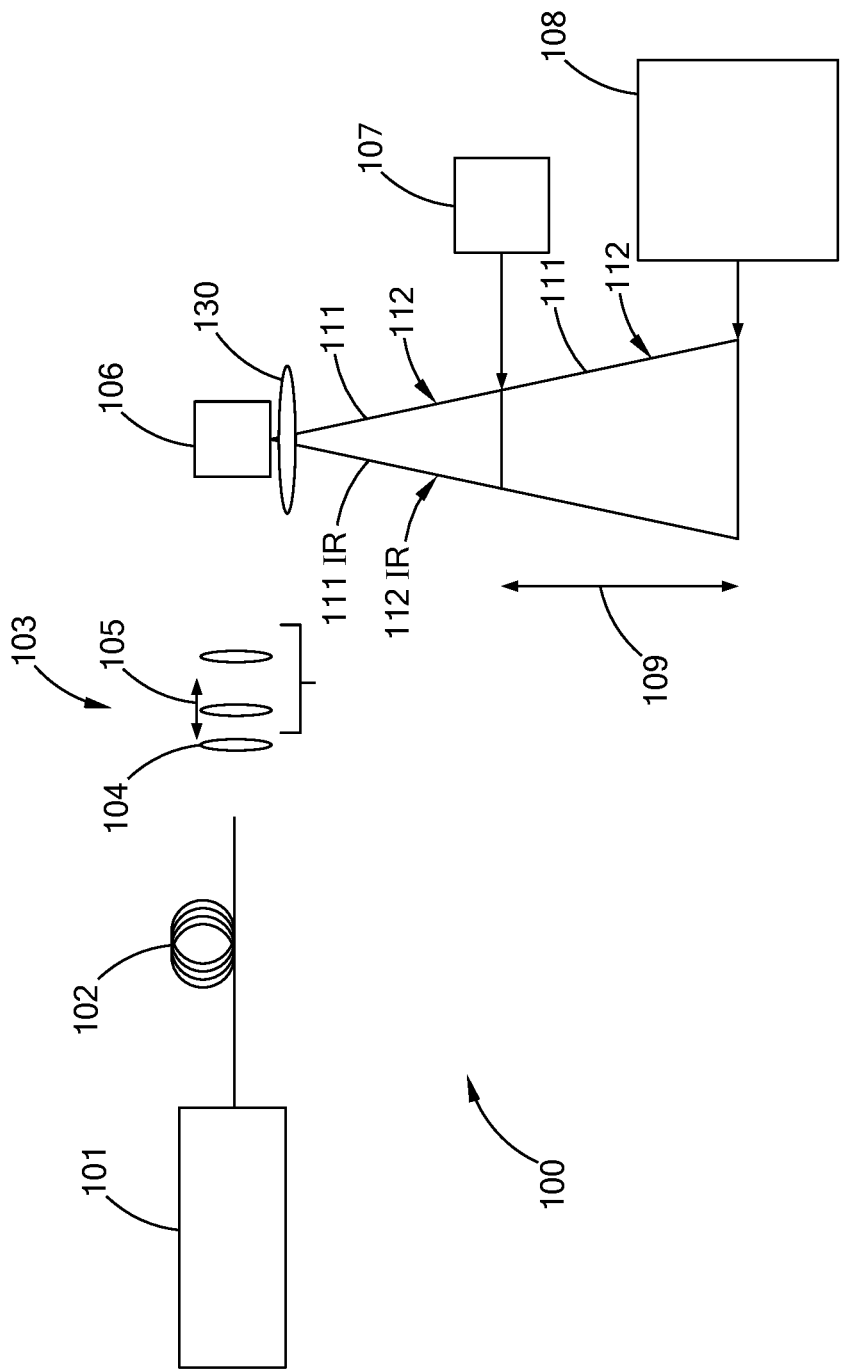
FIG. 1 is a schematic view of an embodiment of a system and process in accordance with the present inventions.

In general, the present inventions relate to laser processing of materials, laser processing by matching preselected laser beam wavelengths to the material to be processed to have high or increased levels of absorptivity by the materials, and in particular laser additive manufacture of raw materials into large structures, parts, components and articles with laser beams having high absorptivity by starting raw materials.

An embodiment of the present invention relates to using laser beams having visible laser beams, and in particular having wavelengths from 350 nm to 700 nm, in additive laser manufacturing process, and in an additive laser manufacturing system, to build articles (e.g., structures, devices, components, parts, films, volumetric shapes, etc.) from raw materials, such as starting powders, nanoparticles, particles, pellets, beds, powder beds, spray powders, liquids, suspensions, emulsions and combinations and variations of these and other starting materials known, or later developed, in the laser additive manufacturing arts, including the 3-D printing arts.

In an embodiment to build articles from raw materials in laser additive processes, wavelengths are used that have lower reflectivity, high absorptivity, and preferably both for the starting raw material. In particular, in an embodiment laser beam wavelengths are predetermined based upon the starting materials to preferably have absorption of about 30% and more, about 40% and more, about 50% and more, and about 60% and more, and in the range of 30% to 65%, 30% to 50%, about and about 40% to about 50%. In particular, in an embodiment laser beam wavelengths are predetermined based upon the starting materials to preferably have reflectivity's of about 97% and less, about 60% and less, about 30% and less, and in the range of 70% to 20%, in the range of 80% to 30%, and in the range of about 75% to about 25%. In embodiments combinations of both these high absorptions and these low reflectivities can be present. In a preferred embodiment of the systems and processes, the laser beam or beams have wavelengths from about 400 nm to about 500 nm are used to build articles from starting materials made up of gold, copper, brass, silver, aluminum, nickel, alloys of these metals, and other metals, non-metals, materials, and alloys and combinations and variations of these.

The use of blue lasers, e.g., about 405 nm to about 495 nm wavelength, to additive manufacture articles from gold, copper, brass, nickel, nickel plated copper, stainless steel, and other, materials, metals, non-metals and alloys, is preferred. Blue laser beams are highly absorbed by these materials at room temperature, e.g., absorptivities of greater than about 50%. One of several advantages of the present inventions is the ability of a preselected wavelength laser beam, such as the blue laser beam, that is better able to better couple the laser energy into the material during the laser operation, e.g., the additive manufacturing process. By better coupling the laser energy to the material being built into an article, the chance of a run away process, which typically can occur with the infrared lasers is greatly reduced and preferably eliminated. Better coupling of the laser energy also allows for a lower power laser to be used, which provides capital cost savings or enables multi-laser systems to be cost effective. Better coupling also provides for greater control, higher tolerances and thus greater reproducibility of built articles. These features, which are not found with IR lasers and in IR laser additive manufacturing operations, are important, to among other products, products in the electronics, micro-mechanical systems, medical components, engine components and power storage fields.

In an embodiment a blue laser that operates in a CW mode is used. CW operation can be preferred over a pulsed lasers, in many additive manufacturing applications, because of the ability to rapidly modulate the laser output and control the building process in a feedback loop, resulting in a highly repeatable process with optimum mechanical and other physical and esthetic properties, such as reduced surface roughness, improved porosity and improved electrical characteristics.

Preferably, in some embodiments active monitoring of the article being build is used to check the quality of the article and the efficiency of the additive manufacturing process and systems. For example, when the laser is processing a high resolution region of the part being printed, a thermal camera can be used to monitor the average temperature of the surface and a feedback loop can be used to decrease or increase the laser power to improve the weld puddle and ultimately the surface quality of the part. Similarly, when the laser beam is defocused to sweep through a large low resolution region of the part, the feedback loop can command more laser power to keep the average temperature at the optimum processing point, greatly reducing the time to print a part.

In a preferred embodiment blue lasers, and laser beams, (e.g., 400 nm to 500 nm and preferably 450 nm to 495 nm, it being understood that green lasers, and generally wavelengths less than about 700 nm can be used) are used in the additive manufacturing system and process. A blue laser offers a substantial improvement in the coupling efficiency of the laser energy, the footprint of the beam on the powder bed and ultimately the speed of the printing process. When producing the same spot size the blue laser system is capable of addressing an area on the powder bed surface that is over 2× that of the infrared system (e.g., 900 nm and greater). This improvement is illustrated in the schematic of FIG. 1. For example, the blue laser system can produce the same size spot as the Infrared Laser (50 mm) but with a much longer focal length lens (1190 mm focal length lens) resulting in a 200 mm×200 mm addressable volume. With a deeper elevator system in the printer, the blue system will be capable of building parts in excess of 8× the size that can be achieved with the infrared lasers.

Thus, embodiments of the present system allow for the building of significantly larger articles as a percentage of the laser cabinet, or workable area within the system. The workable area within the system is defined, unless expressly stated otherwise, as that area in which the laser beam path in free space (i.e., from the beam leaving the laser or scanning head/window/nozzle) can contact starting material. Thus, the embodiments of the present blue laser systems allow articles to be built that fill about 50% or more of the workable area, about 60% or more of the workable area, about 70% or more of the workable area and about 80% or more of the workable area and from about 50% to about 80%.

Embodiments of the present systems and operations allow the top of the finished article to be much closer to the start of the laser beam path in free space than with IR systems. Thus, a greater percentage of the laser beam path can be used for manufacturing purposes. For example, embodiments of the present systems can use about 50% and more, about 60% and more, about 70% and more, about 80% and more, and from about 50% to about 80%, of their laser beam path for manufacturing, i.e., the laser beam path is in contact with the starting material, the article and both.

Turning to FIG. 1, there is shown a schematic flow diagram of an embodiment of a blue laser system of the present invention. FIG. 1 also shows a comparison between the scanning volume achievable with the blue laser system compared to an infrared laser source when the spot size is the same for both systems. The blue laser additive manufacturing system 100 shown in FIG. 1 illustrates the basic component of a system that can be used for additive manufacturing, but also may be used for marking, remote welding, remote soldering and remote cutting to name a few. Thus, in an embodiment of the additive manufacturing system 100, there is a laser system 101 for propagating a blue laser beam. The laser system 101 is in optical communication with an optical fiber 102 for delivery of the laser beam to the optical delivery assembly 103. In this manner the fiber optic 102 places the laser system 101 in optical communication with the optical delivery assembly 103. The optical delivery assembly 103 has a collimating optic 104, and a movable optic 105. The laser beam is collimated by a simple lens after exiting the delivery fiber. After the collimator, an electronically adjustable focal shift compensator can be used to correct for any field curvature on the powder bed from the F-Theta lens. (In FIG. 3 there is shown an embodiment of a simple focal shift compensator, where the collimation of the beam is altered by moving the second lens, which can be used with systems like that of the embodiment of FIG. 1.) The system 100 has an x-y scanning system 106 and after the x-y scanner an F-Theta lens 130. The blue laser system 100 produces a footprint of scanable area 108, e.g., the area that can be scanned by the laser beam spot. In FIG. 1, for comparison purposes, there is shown an IR system scanable area 107, that would be obtained using the same spot size as the blue laser system. In this figure the IR laser beam path 111 IR, and IR laser beam 112 IR are super imposed over (for comparison purposes) the blue laser beam path 111 and the blue laser beam 112. Thus, the scanable area 108 for the blue laser system is twice as large as the scanable area 107 for the IR laser system, with both systems having the same spot size. Arrow 109 illustrates that the blue laser system produces the same spot size as the IR system, but at a distance that is over twice as far away from the focusing lens. In the embodiment of FIG. 1 the F-theta lens 130 is located after the scanner 106. Thus, the F-theta is in the laser beam path 111 and the laser beam 102, after the path and beam leave the scanner 106. The embodiment of the system of FIG. 1 can be dependent upon the characteristics of the F-theta lens—scanner combination, which can affect the field size and the laser power the lens system can handle.

Figure 2:
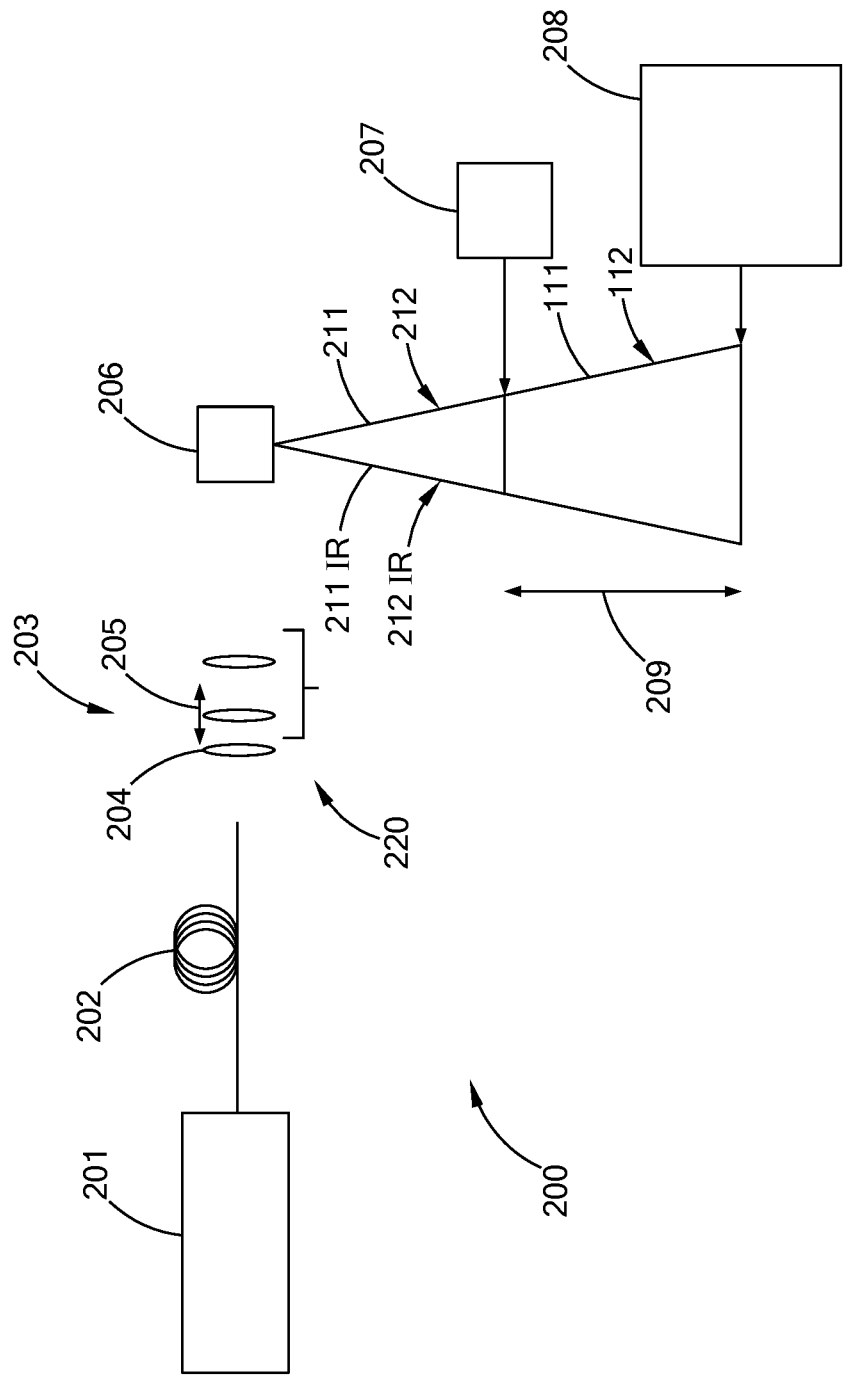
FIG. 2 is a schematic view of an embodiment of a system and process in accordance with the present inventions.

Turning to FIG. 2, there is shown a schematic flow diagram of an embodiment of a blue laser system of the present invention. FIG. 2 also shows a comparison between the scanning volume achievable with a blue laser system compared to an infrared laser system when the spot size is the same for both systems. The embodiment of the system of FIG. 2 avoids the dependencies on the characteristics of the F-theta lens—scanner combination that are present in the embodiment of FIG. 1. In FIG. 2, the F-theta lens has been eliminated and the laser beam is now focused by a rapidly adjustable focusing lens system using a focusing lens in place of the F-Theta and before the scanner. (The embodiment of FIG. 3 can also be used.) Thus, in an embodiment of the additive manufacturing system 200, there is a laser system 201 for propagating a blue laser beam. The laser system 201 is in optical communication with an optical fiber 202 for delivery of the laser beam to the optical delivery assembly 203. In this manner the fiber optic 202 places the laser system 201 in optical communication with the optical delivery assembly 203. The optical delivery assembly 203 has a collimating optic 204, and a movable optic 205. The system 200 has an x-y scanning system 206. the laser beam and laser beam path leaves the x-y scanner and is in free space and travels or is directed toward the target, e.g., the starting material. The blue laser system 200 produces a footprint of scanable area 208, e.g., the area that can be scanned by the laser beam spot. In FIG. 2, for comparison purposes, there is shown an IR system scanable area 207, that would be obtained using the same spot size as the blue laser system 200. In this figure the IR laser beam path 211 IR, and IR laser beam 212 IR are super imposed over (for comparison purposes) the blue laser beam path 211 and the blue laser beam 212. Thus, the scanable area 208 for the blue laser system is twice as large as the scanable area 207 for the IR laser system, with both systems having the same spot size. Arrow 209 illustrates that the blue laser system produces the same spot size as the IR system, but at a distance that is over twice as far away from the focusing lens.

The focusing lens system 220 resembles a zoom optic in that the central lens may be either a positive or negative component that is physically moved at a rapid speed to adjust the focal length of the lens system. This focusing of the beam is synchronized with the scanning of laser beam by the X-Y scanning system to simulate flat field characteristic of a laser beam scanning through an F-Theta lens system. Thus, focusing system 220 and scanner 206 are in synchronized and in control communication with a controller or control system on the system 200. This requires the electronically controlled focusing element to be sufficiently fast to keep up with the X-Y scanning, which is achievable with high speed servo systems.

Turning to FIG. 3 there is shown an embodiment of a simple focal shift compensator, where the collimation of the beam is altered by moving the second lens. This simple focal shift compensator can be used with embodiments of the present blue laser additive systems, as well as, other additive systems and other laser operation, processing or delivery devices.

Figure 3A:
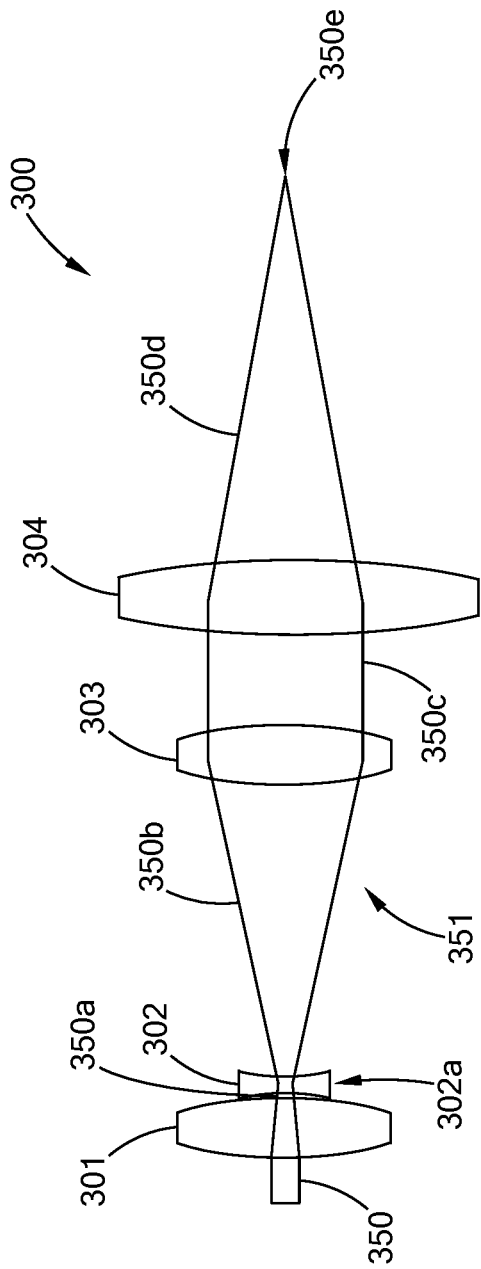
FIGS. 3A and 3B are a schematic view of an embodiment of a lens system at different lens positions in accordance with the present inventions.
Figure 3B:
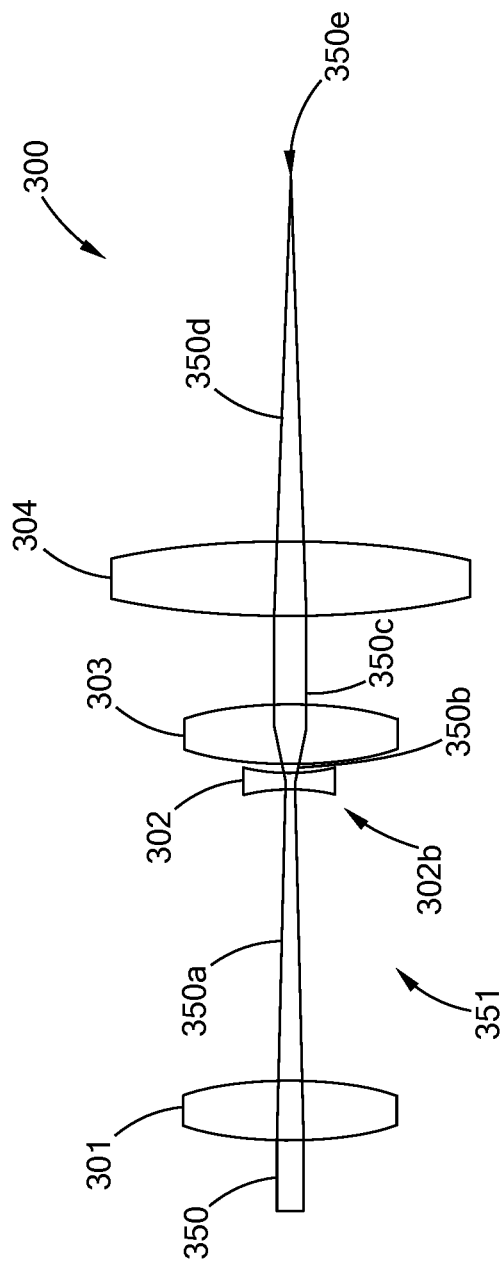

FIG. 3A shows the optics system 300 in a position where the smallest spot size is produced. And, FIG. 3B shows the optics system 300 in a position where the largest spot size is produced.

The system 300 can consist of a 50 mm focal length first lens 301, a −12 mm focal length second lens 302, which is movable between a first position 302a and a second position 302b, and a 50 mm focal length third lens 303. The system 300 has an F-Theta lens 304 1000 mm.

The laser beam 350 travels into and through lens 301, leaving lens 301 the laser beam 350a enters lens 302 and travels into and through lens 302. The laser beam 350b leaves lens 302 and travels into and through lens 303. The laser beam 350c, on the laser beam path, between lens 3030 and lens 304 has a divergence that is dependent upon the position of lens 302. Thus, in FIG. 3A, the laser beam 350c has the lowest divergence, and in FIG. 3B, the laser beam 350c has its highest divergence. The laser beam 350d leaves lens 304 to form a laser beam spot 350e. Thus, laser beam 350 moves along the laser beam path 351 it is modified by the lens along the laser beam path 351, to provide the various configurations of the laser beam, i.e., 350a, 350b, 350c, 350d and 350e, all of which are on laser beam path 351.

Thus, lens 302 moves along, and is positionable along, laser beam path 351 between lens 301 and 303.

Spot 350e in FIG. 3A is the smallest spot size, 50 μm, and in FIG. 3B the largest spot size, 100 μm. The position of lens 302 can be at any point between positions 302a, 302b, and the spot size can be any sizes from 50 to 100 μm. Additionally, different power lens can be used and different placements can be used to provide larger and smaller spot sizes, and larger and smaller ranges of spot sizes.

It should be noted that in FIG. 3 the figures are out of proportion in the vertical to provide a more understandable teaching, given the constrains of drawing sizes, of the effective change in focal length and spot size provided by embodiments of the system 300.

For example, when the lenses are in the starting position FIG. 3A, the divergence of the laser beam is minimized and as a consequence the spot size is minimized (50 µm), however when the lenses are in the final position FIG. 3B, the divergence of the laser beam is maximized and the spot size is its largest (100 µm). The system would be set up with the neutral position of the lenses being such that equal displacement of the moveable lens would result in the proper correction in spot size whether the F-theta lens 304 focal length is longer at that point or shorter at that point. Since an F-Theta optic is being used, the amount of movement of the lens is small because the compensation required is relatively small. This allows the compensator, system 300, to operate at a very high speed. In addition, the focal shift compensator can be used to increase the spot size on the powder bed to enable a more rapid printing of the part.

To print a 3-D parts, these systems preferably have a vertical translation stage or elevator to lower the part a finite amount after each layer is printed. Further, starting material, e.g., powder, can be spread for example by a roller or a blade and is achieved in a conventional manner after each layer is printed and after the powder is deposited at edge of the printing area.

Remote cutting or welding using these systems can be accomplished with an embodiment of these systems. An embodiment of a cutting system for thin materials such as foils or polymers includes this scanning system. The material is naturally ablated by the high intensity laser beam creating a gaseous bloom as it vaporizes the material, or there is a gas blowing across the part that is being processed, or a vacuum is being applied to the backside of the part to remove the molten material as it is created by the scanning beam. This can be accomplished by either overpressure above the material being cut and a template below the material to be cut. Similarly, by drawing a vacuum below the part through a cutting template, a pressure differential can be created from on top of the part to below the part. When the laser beam passes over the template, that region of the template removes the molten materials. Remote welding requires the parts to be in a proper fixture that applies pressure at precisely the right points, and a proper shielding gas has to be used to insure that the material being welded does not oxidize during the welding process. The shielding gas can be a noble gas such as Argon or an Argon-Hydrogen mixture to getter any free oxygen in the welding environment. The use of a blue laser with a scanner will represent a major improvement in the ability to weld and cut materials at very high speeds.

An example of the laser for providing a laser beam, for use in the present systems is a 200 Watt single mode blue laser with an $M^2$ of 1.5 or less, collimated by a 14 mm focal length lens and focused on the work piece by a 1.2 meter focal length lens. The laser power maybe about 100 W to 1,000 W, about 100 W to about 500 W, about 100 W, about 150 W, about 200 W, about 1000 W, and from about 100 W to about 750 W, greater and lower powers may also be used. This produces a spot size of 50 µm and a fluence level of up to 10 MW/cm². In order to keep from ablating the material, the laser beam must be turned on and off at a very rapid rate which translates into the resolution of the part. For example, if the laser beam is modulated at 100 kHz and scanned at a rate of 5 m/sec, then the write beam resolution is approximately, 50 µm. This is the spatial resolution that could be achieved by rapidly turning the laser beam on and off at full scan speeds. At higher modulation rates, e.g., 1 MHz and short focal length lens, e.g., 100 mm, it is feasible to have a spatial resolution of 5 µm. Similarly, with even shorter focal length lenses it is feasible to get to a submicron spatial resolution with this laser since the focal spot size is directly proportional to the wavelength of light, and a blue laser system can be focused to a submicron spot size, where as an infrared laser cannot. Further, the laser systems, and lasers of disclosed and taught in Ser. No. 14/787,393 (Devices, Systems and Methods for Three-Dimensional Printing), Ser. No. 14/837,782 (Applications, Methods and Systems for Materials Processing with Visible Raman Laser) and Ser. No. 62/193,047 (Applications, Methods and Systems for a Laser Deliver Addressable Array) the entire disclosure of each of which is incorporated herein by reference.

By resolution of the laser systems, resolution of the method, it is meant that the system and method have the ability to build a part, or have features in that part, that are at the resolution. Thus, by way of example a 75 µm resolution would provide the ability to build parts having their smallest dimension at 75 µm, having their smallest feature at 75 µm, or both. Embodiments of the blue laser 3-D additive manufacturing systems, e.g., 3-D blue laser printers, and embodiments of the blue laser 3-D additive manufacturing methods have resolutions from about 1 µm to about 200 µm, and larger, about 1 µm to about 100 µm, about 1 µm to about 50 µm, less than about 100 µm, less than about 75 µm, less than about 50 µm, less than about 25 µm, less than about 10 µm, and less than about 5 µm. The systems can have both the capability for large resolution, e.g., greater than 200 µm, and very fine resolution of about 1 µm to about 10 µm, and 1 µm to about 5 µm.

Examples of scanners and optics that can be used with the present systems include mirrors mounted on high speed motors, rotating polygon mirrors or high speed galvanometers. A mirror mounted on axis of a high speed motor can create a scanning beam as the mirror is rotated through 360 degrees. The higher the speed of the motor, the faster the scan. The only issue with this approach is that the laser must be turned off once, the mirror is no longer reflecting the beam as the back side of the mirror passes by the laser beam entrance aperture. The high speed mirror can be used to scan either the x axis or the y axis, whichever axis is chosen, the mirror which scans the other axis must scan at a slow speed proportional to the time it takes to complete one full scan in the initial axis. It is preferred to use a high speed stepper motor in this axis to enable the mirror to be moved in discrete steps while remaining stationary while the first axis is completing its scan. Similarly, a multi-faceted mirror or polygon mirror can be used to perform the high speed scan function allowing higher scan speeds because the scan is reset to the starting position as the beam transitions across each facet of the mirror. These types of mirrors are currently being used in supermarket scanners to scan a product's bar code as it passes by. The primary axis can also be scanned with a high speed galvanometer type mirror which is a resonant type motor and oscillates at a continuous frequency producing high speed movement of the beam. It is also possible to precisely position galvanometer mirrors to a predetermined position, allow systems based on the first and second axis being a galvanometer driven mirror to draw in a vector mode where any point on the process bed can be rapidly addressed by simultaneously moving both mirrors. It is also feasible to combine mirrors mounted on translation stages in a "flying optic" type design where the beam is delivered through free space to a mirror mounted on a gantry style system and is moved in a two dimensional, raster or vector mode at very high speeds.

In an embodiment of the system and process there is a blue laser system coupled to an X-Y scanning system.

In an embodiment of the system and process the scanning blue laser system includes an electronically adjustable lens system to focus the laser beam "on the fly" and simulate the performance of an F-Theta lens.

In embodiments of the systems and processes the scanning blue laser system includes an electronically adjustable lens system that is used to compensate for the field curvature of an F-Theta lens system.

In embodiments of the systems and processes the scanning blue laser system includes an electronically adjustable lens system to allow the laser beam diameter to be adjusted "on the fly" as the laser beam is scanned.

In embodiments of the systems and processes the scanning blue laser system includes the capability to and is used to remotely weld metal and non-metal materials.

In embodiments of the systems and processes the scanning blue laser system is used to remotely cut metal and non-metal materials.

In embodiments of the systems and processes the scanning blue laser system the blue laser scanning system that produces the same spot size as an infrared laser source, but addresses over 2× the area and over 8× the volume of the infrared laser.

In embodiments of the systems and processes the scanning blue laser system is used to solder electrical connections.

It should be noted that the schematics and examples do not address or show aberration balancing, as they are just illustrative of the embodiment of the present optic systems. Aberration compensation can be, and preferably is, used with these systems.

The following examples are provided to illustrate various embodiments of the present laser systems and operations and in particular a blue laser system for welding components in electronic storage devices. These examples, may be prophetic, are for illustrative purposes and should not be viewed as, and do not otherwise limit the scope of the present inventions.

Example 1

Figure 4:
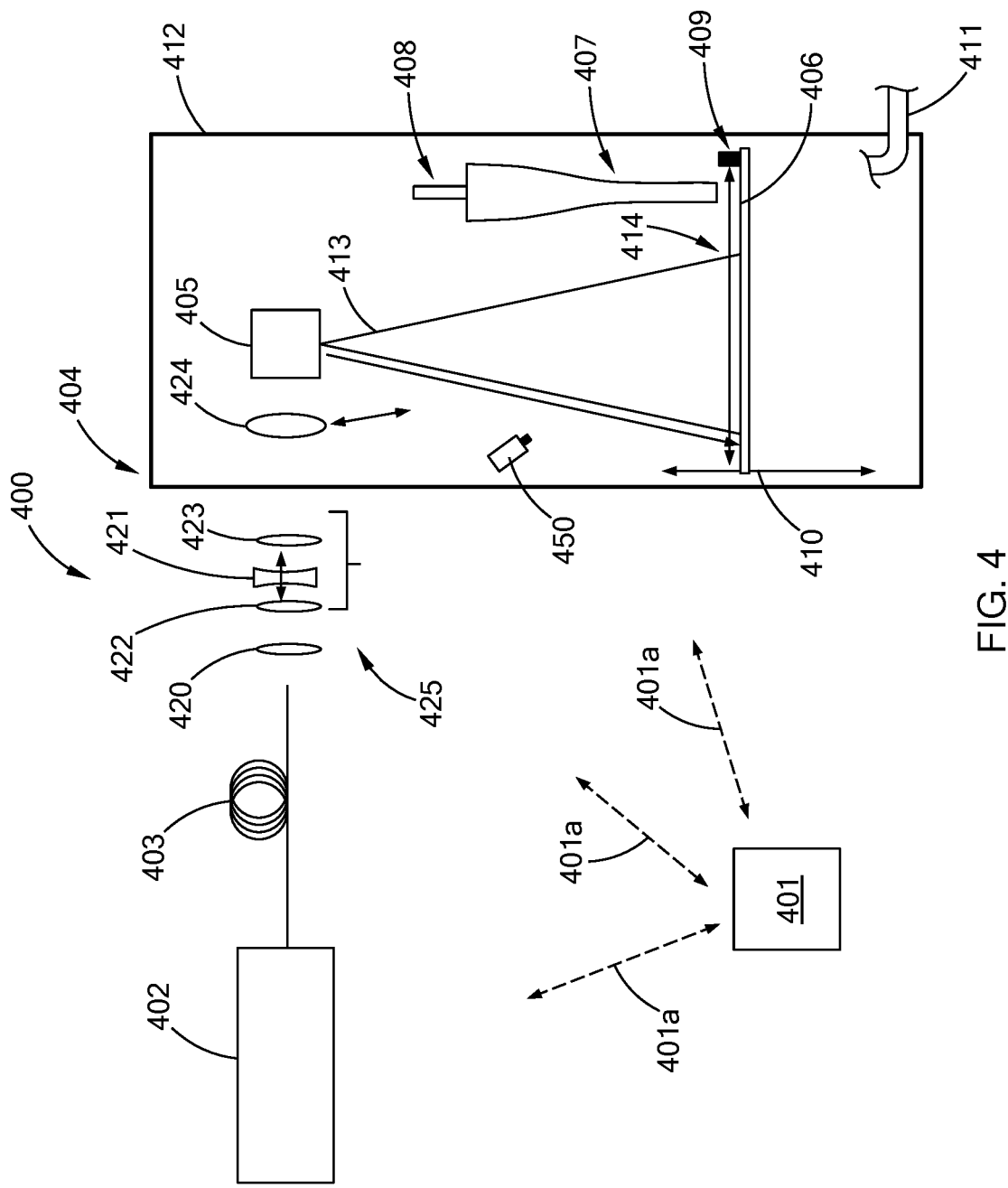
FIG. 4 is a schematic view of an embodiment of a 3-D laser printing systems in accordance with the present inventions.

Turning to FIG. 4, there is provided a schematic of a blue laser based 3-D printing system. This embodiment of a blue laser additive manufacturing system 400 has a computer system 401 for converting the Computer Assisted Design (CAD) information into slices using either an open source code or proprietary software, and which is in control communication (dashed arrows 401a) with the components of the system 400, a single mode blue laser source 402 with an output power up to 200 Watts, an optical fiber 403, an optic assembly 404, a zoom optic system which can be electronically controlled, an X-Y scanner 405, such as a pair of Galvonometers, a powder bed 406, a means to deliver powder to the bed and level it such as powder dispensing system 407, that can have a filling port 408, which can be manually or automatically filled, and a precision wiper 409 for leveling the power layer once it has been applied, a z-axis elevator 410 to incrementally drop the powder bed as each layer is written, and a fume extraction system 411 to extract welding fumes as well as unfused powder. An enclosure 412, (e.g., a housing, hood, cover, sealed chamber or other similar containment like structure) that preferably contains an inert gas or a minimal oxygen environment. The optic assembly 404 has a collimating optic 420, and three lenses 421, 422, 423, where lens 421 is movable between lenses 422 and 423 (optics 421, 422, 423 make up adjustable lens system 425), and a focusing optic 424, which is a 1.2 mm focal length lens. The laser beam path 413 from the scanner 405 provides an addressable field 414 that is 170 mm×170 mm. The elevator provides for 170 mm of vertical movement, providing an addressable volume of 170 mm×170 mm×170 mm.

There is a monitoring device 450 located within the enclosure 412. The monitoring device is in control communication with the computer system 401. The computer system, preferably can be a controller, computer, and combinations of these, that has input and outputs, such as I/O. The system 401 can receive and analyze information and data from sensors and monitors in the system and send control signals to the components of the system to control and adjust the laser operation that the system is performing. Such adjustments would include, among others scanning speed, beam spot size, and beam power. The monitor can be a pyrometer, spectrograph, thermal couple, video camera, to name a few. For example, when performing laser welding a pyrometer can be used to determine the temperature of the weld puddle and by providing this temperature information to the control system, the system can control the laser operation to maintain the weld puddle at a predetermined temperature.

The 200 Watt laser beam is delivered through an adjustable lens system 425 where the central negative lens 421 is the only lens being moved so it can be moved at a relatively high speed. This system is a 50 mm focal length first lens 422, a −12 mm focal length second lens 422 and a 50 mm focal length third lens 423. The final optic 424 can be a 1200 mm focusing optic, which will focus the beam according to its position on the powder bed. For example, when addressing the area in the center of the powder bed, the adjustable optic will be at a position where the starting spot size is on the order of 100 μm. Here, the distance from the primary focusing optic to the powder bed is at its shortest distance so less collimation is required to focus the spot to the correct size. At the fullest X-Y extent, which corresponds to a point 85 mm×85 mm from the central point of the powder bed, the optic is adjusted to the highest degree of collimation, producing the correct spot at the exact focal length of the lens which in this case is the same as the 100 μm in the center of the powder bed. The pattern is rapidly scanned either in a vector fashion or a raster scan to create a weld bead the approximate width of the laser beam and a predetermined thickness, such as 20 μm, 50 μm, or 100 μm.

The 3-D printing process consists of first loading the powder feeders with the correct mixture of powders to achieve the desired alloy for the build. The powder feeders are sealed off, and the enclosure at this point, may be evacuated and the powder bed/powder raised to an elevated temperature to drive off any humidity. The system is then backfilled with an inert gas at 0.5 atm, 1 atm, or 2 atm, depending on the process to be conducted. When the system is started the powder dispenser places a pile of powder on the powder bed elevator plate and a precision wiper distributes the powder across the powder bed. The laser is then initialized by the computer control system, and the first layer of removal material is deposited. This material is typically softer than the final part to simplify removal of the part from the build plate. The pattern as determined by the software is then scanned across the powder bed until the first layer is welded to the build plate. The elevator is then engaged and the part is dropped a predetermined amount corresponding to the height of the build, such as 20 μm, 50 μm, or 100 μm. The powder dispenser then places a pile of powder on the top of the previous powder deposit and the leveling system levels the powder on the bed. This process repeats itself until all layers and support structures associated with the CAD model have been processed. The part is then removed from the build chamber, the loose powder is blown out of the part, and the part is then machined to final finish. This may include removal of the build plate, machining bosses, drilling and tapping as well as tumbling to reduce surface roughness. In some cases, the parts may also be post heat treated to relieve any built up stresses that occurred during the build process.

Example 2

Figure 5:
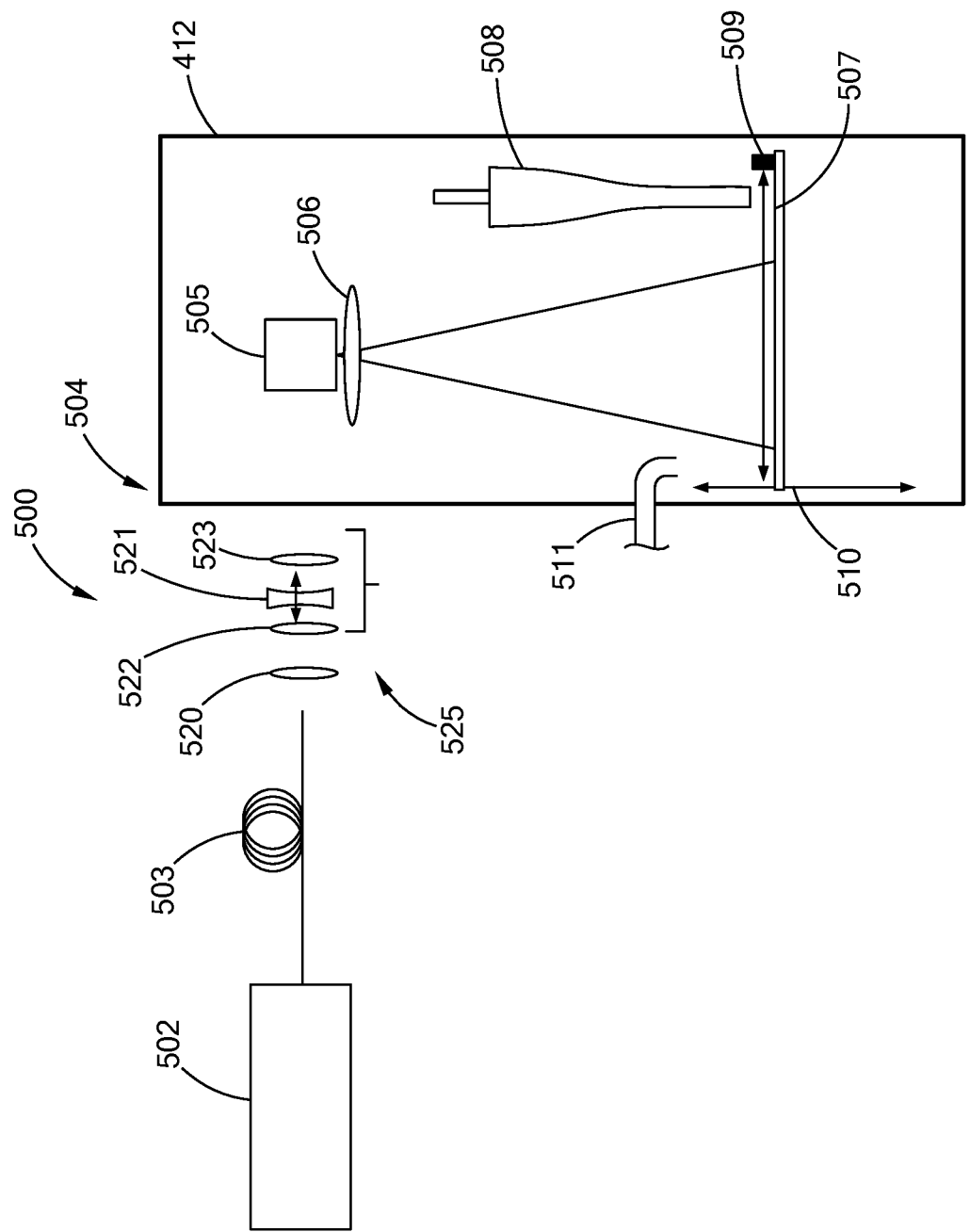
FIG. 5 is a schematic view of an embodiment of a 3-D laser printing system in accordance with the present inventions.

Turning to FIG. 5, there is provided a schematic of a blue laser based 3-D printing system using an F-Theta lens. This embodiment of a blue laser additive manufacturing system has a computer system for converting the Computer Assisted Design (CAD) information into slices using either an open source code or proprietary software (not shown in the drawing), a single mode blue laser source 500 with an output power up to 200 Watts, an optical fiber 503, a variable beam expander system 504 which can be electronically controlled and that has a collimating lens 520 and a beam expander system 525, an X-Y scanner 505 such as a pair of Galvonometers, an F-Theta lens 506, a powder bed 507, a deliver powder apparatus 508 that delivers the power to the bed and leveling or wiper device 509, a z-axis elevator 510 to incrementally drop the powder bed as each layer is written, and a fume extraction system 511 to extract welding fumes as well as unfused powder. The 200 Watt laser beam is delivered through an adjustable beam expander system 525 where the central negative lens 521 is the only lens being moved so it can be moved at a relatively high speed. This beam expander system 525 is only necessary if there is a desire to change the spot size of the laser beam on the fly through the F-Theta lens 506 system. This variable beam expander system 525 is a 50 mm focal length first lens 522, a −12 mm focal length second lens 521 and a 50 mm focal length third lens 523. The F-Theta lens 506 can be a 1200 mm focusing optic which has a flat field and as a consequence. The beam is constantly in focus from the center of the scan pattern to the edge of the scan pattern. However, if a larger spot is needed to write a "fill" portion of the part more quickly, then the beam collimator can be adjusted to expand the beam size from a nominal 50 µm to 75 µm, 100 µm, or 150 µm. The laser power may also have to be increased to maintain a stable weld puddle. The pattern is rapidly scanned either in a vector fashion or a raster scan to create a weld bead the approximate width of the laser beam and at a predetermined thickness, such as 20 µm, 50 µm, or 100 µm. This scanned pattern may cover a 100×100 mm area, a 150×150 mm area or a 250×250 mm area. The height of the part is limited only by the height of the chamber and the size of the powder reservoirs. This height may be 50 mm, 100 mm, 150 mm, 300 mm or greater.

The 3-D printing process consists of first loading the powder feeders with the correct mixture of powders to achieve the desired alloy for the build. The powder feeders are sealed off, and the enclosure at this point, may be evacuated and the powder bed/powder raised to an elevated temperature to drive off any humidity. The system is then backfilled with an inert gas at 0.5 atm, 1 atm, or 2 atm, depending on the process to be conducted. When the system is started the powder dispenser places a pile of powder on the powder bed elevator plate and a precision wiper distributes the powder across the powder bed. The laser is then initialized by the computer control system, and the first layer of removal material is deposited. This material is typically softer than the final part to simplify removal of the part from the build plate. The pattern as determined by the software is then scanned across the powder bed until the first layer is welded to the build plate. The elevator is then engaged and the part is dropped a predetermined amount corresponding to the height of the build, such as 20 µm, 50 µm, or 100 µm. The powder dispenser then places a pile of powder on the top of the previous powder deposit and the leveling system levels the powder on the bed. This process repeats itself until all layers and support structures associated with the CAD model have been processed. The part is then removed from the build chamber, the loose powder is blown out of the part, and the part is then machined to final finish. This may include removal of the build plate, machining bosses, drilling and tapping as well as tumbling to reduce surface roughness. In some cases, the parts may also be post heat treated to relieve any built up stresses that occurred during the build process.

Example 3

In embodiment the laser beam is pulsed by turning the current to the laser diodes off rapidly in response to an analog input signal of 0-10V or 0-5V. The analog signal is amplified through an operational amplifier, which is then used to linearly control a constant current circuit based on a Field Effect Transistor.

Example 4

In preferred embodiments the laser beam pulse rate and scan rate are predetermined so that the build material is melted or other wise joined, without ablation. Examples of non-ablative temperatures, e.g., melting points, where the material may be joined are provided in the table of this example.

| Metal | Melting Point (° C.) |
| --- | --- |
| Aluminum | 660 |
| Aluminum Alloy | 463-671 |
| Aluminum Bronze | 1027-1038 |
| Brass Red | 1000 |
| Brass Yellow | 930 |
| Chromium | 1860 |
| Copper | 1084 |
| Gold | 1063 |
| Hastelloy C | 1320-1350 |
| Inconel | 1390-1425 |
| Magnesium | 650 |
| Magnesium Alloy | 349-649 |
| Nickel | 1452 |
| Platinum | 640 |
| Silver | 961 |
| Carbon Steel | 1425-1540 |
| Stainless Steel | 1510 |
| Titanium | 1670 |
| Tungsten | 3400 |

Example 5

Illustrative relationships of embodiments of different minimum feature size, scan rate and modulation (e.g., pulse) rate assuming a 50% overlap of the spots to achieve a minimum feature size is provided in the table of this Example.

| Scan Length (m) | | | | |
|---|---|---|---|---|
| 0.25 | 0.25 | 0.25 | 0.25 | 0.25 |
| Minimum Feature Size (um) | | | | |
| 125 | 63 | 42 | 31 | 25 |
| Spatial Frequency (Spots/Scan) | | | | |

| Scan Rate (m/sec) | 2000 Modulation Rate (Hz) | 4000 Modulation Rate (Hz) | 6000 Modulation Rate (Hz) | 8000 Modulation Rate (Hz) | 10000 Modulation Rate (Hz) |
|---|---|---|---|---|---|
| 0 | 0 | 0 | 0 | 0 | 0 |
| 10 | 40,000 | 80,000 | 120,000 | 160,000 | 200,000 |
| 20 | 80,000 | 160,000 | 240,000 | 320,000 | 400,000 |
| 30 | 120,000 | 240,000 | 360,000 | 480,000 | 600,000 |
| 40 | 160,000 | 320,000 | 480,000 | 640,000 | 800,000 |
| 50 | 200,000 | 400,000 | 600,000 | 800,000 | 1,000,000 |
| 60 | 240,000 | 480,000 | 720,000 | 960,000 | 1,200,000 |
| 70 | 280,000 | 560,000 | 840,000 | 1,120,000 | 1,400,000 |
| 80 | 320,000 | 640,000 | 960,000 | 1,280,000 | 1,600,000 |
| 90 | 360,000 | 720,000 | 1,080,000 | 1,440,000 | 1,800,000 |
| 100 | 400,000 | 800,000 | 1,200,000 | 1,600,000 | 2,000,000 |
| 110 | 440,000 | 880,000 | 1,320,000 | 1,760,000 | 2,200,000 |
| 120 | 480,000 | 960,000 | 1,440,000 | 1,920,000 | 2,400,000 |
| 130 | 520,000 | 1,040,000 | 1,560,000 | 2,080,000 | 2,600,000 |
| 140 | 560,000 | 1,120,000 | 1,680,000 | 2,240,000 | 2,800,000 |
| 150 | 600,000 | 1,200,000 | 1,800,000 | 2,400,000 | 3,000,000 |
| 160 | 640,000 | 1,280,000 | 1,920,000 | 2,560,000 | 3,200,000 |
| 170 | 680,000 | 1,360,000 | 2,040,000 | 2,720,000 | 3,400,000 |
| 180 | 720,000 | 1,440,000 | 2,160,000 | 2,880,000 | 3,600,000 |

In general, there is minimal to no variation in the absorptivity with scan rate. However, typically, there is a thermal diffusivity present, which limits the depth of the melt puddle. Thus, at higher scan rates, the depth is at a minimum; and at lower scan rates, the depth is at a maximum.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and with existing equipment or activities which may be modified, in-part, based on the teachings of this specification. Further, the various embodiments set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

The invention claimed is:

1. A blue laser system, the system comprising: a blue laser source capable of propagating a blue laser beam; an X-Y scanning system in optical communication with the blue laser source, whereby the system is configured for directing and scanning the blue laser beam to an addressable field; and an enclosure housing the addressable field; and, an electronically adjustable lens system; the lens system comprising a first optic, a second optic, and a third optic, wherein the second optic is located along a laser beam path between the first optic and the third optic, wherein the second optic is movable between a plurality of positions along the laser beam path, whereby the lens system is configured for on the fly focusing to simulate the performance of an F-Theta lens.

2. The blue laser system of claim 1, wherein the addressable field has an area in the range of from about 100 mm×100 mm to about 200 mm×200 mm.

3. The blue laser system of claim 1, wherein the addressable field is an addressable volume having an area in the range of from about 100 mm×100 mm×100 mm to about 800 mm×400 mm×500 mm.

4. The blue laser system of claim 1, wherein the system is capable of performing a laser operation selected from the group operations consisting of welding metal, cutting metal, cutting non-metal, and soldering electronic components.

5. The blue laser system of claim 1, wherein the system is capable of performing a laser operation; the laser operation including welding metal, cutting metal and cutting non-metal.

6. A blue laser system, the system comprising:

a. a blue laser source capable of propagating a blue laser beam; an X-Y scanning system in optical communication with the blue laser source, whereby the system is configured for directing and scanning the blue laser beam along a laser beam path to an addressable field; and an enclosure housing the addressable field;

b. an electronically adjustable lens system; the lens system comprising a first optic, a second optic, and a third optic, wherein the second optic is located along a laser beam path between the first optic and the third optic; wherein the second optic is movable between a plurality of positions along the laser beam path; whereby the lens system is configured to focus the blue laser beam to a spot, having a blue laser beam spot size; and whereby the lens system is configured for on the fly focusing to simulate the performance of an F-Theta lens;

c. whereby the addressable field defines an area;

d. whereby the area of the addressable field is 2× larger than an area of an addressable field for an infrared laser beam having an infrared laser beam spot size that is the same size as the blue laser beam spot size and that is propagated through the system along the same laser beam path.

7. The blue laser systems of claim 1 or 6, further comprising a controller, wherein the controller is capable of adjusting a diameter of the laser beam based upon the size of the addressable field; and, wherein the controller is capable of adjusting a power of the laser beam to maintain a weld puddle at a predetermined temperature.

8. The scanned blue laser systems of claim 1 or 6, comprising a pyrometer capable of monitoring a temperature of a weld puddle and provide a feedback signal to a control system; whereby the system is capable of maintaining the weld puddle at a predetermined temperature.

9. The scanned blue laser system of claim 1, comprising a thermal camera capable of monitoring a temperature of a weld puddle; a control system having an image processing system capable of determining the size and temperature of a weld puddle; wherein the thermal camera is capable of providing well puddle temperature and size information to the control system; and whereby the control system is capable of maintaining the weld puddle at a predetermined size and temperature.

10. The scanned blue laser system of claim 9, wherein a camera is capable of monitoring the size and shape of the weld puddle to provide information to determine the laser power and spot size required to maintain a predetermined well puddle size and stability.

11. The scanned blue laser system of claim 6, is capable of processing non-metals.

12. The scanned blue laser system of claim 6, is capable of marking metals.

13. The scanned blue laser system of claim 6, is capable of soldering metals.

* * * * *